United States Patent
Camin et al.

(10) Patent No.: US 6,485,775 B1
(45) Date of Patent: Nov. 26, 2002

(54) STARCHY FOOD-BASED FINE PARTICLE FAT SUBSTITUTE

(75) Inventors: Henry J. Camin, Pocatello, ID (US); Lawrence G. Johnson, Los Angeles, CA (US); Rick C. Norton, Pocatello, ID (US); Joel R. Tinsley, Blackfoot, ID (US); Richard A. Williams, Plymouth, MN (US)

(73) Assignee: Basic American, Inc., San Francisco, CA (US)

( * ) Notice: Subject to any disclaimer, the term of this patent is extended or adjusted under 35 U.S.C. 154(b) by 0 days.

(21) Appl. No.: 09/419,314

(22) Filed: Oct. 15, 1999

Related U.S. Application Data

(60) Provisional application No. 60/104,469, filed on Oct. 16, 1998.

(51) Int. Cl.$^7$ .......................... A23L 1/2165; A23L 1/052
(52) U.S. Cl. ................ 426/637; 426/573; 426/661; 426/518; 426/804
(58) Field of Search ................ 426/549, 573, 426/661, 602, 603, 604, 804, 518, 658, 637, 629, 634, 618, 560, 578

(56) References Cited

U.S. PATENT DOCUMENTS

| | | | |
|---|---|---|---|
| 2,759,832 A | * | 8/1956 | Cording et al. |
| 3,594,187 A | * | 7/1971 | Liepa |
| 3,615,724 A | * | 10/1971 | Sech .......................... 426/438 |
| 3,864,214 A | * | 2/1975 | Ohakas ...................... 206/186 |
| 3,886,291 A | * | 5/1975 | Willard ...................... 426/637 |
| 4,238,520 A | | 12/1980 | Miller et al. ................ 426/604 |
| 4,341,811 A | | 7/1982 | Rule .......................... 426/602 |
| 4,360,535 A | | 11/1982 | Darling et al. ............. 426/570 |
| 4,649,052 A | * | 3/1987 | Sumi et al. .................. 426/49 |
| 4,911,946 A | | 3/1990 | Singer et al. ............... 426/658 |
| 5,104,674 A | * | 4/1992 | Chen et al. ................. 426/573 |
| 5,153,020 A | * | 10/1992 | Singer et al. ............... 426/567 |
| 5,158,796 A | | 10/1992 | Bernhardt et al. .......... 426/549 |
| 5,338,562 A | | 8/1994 | Humphreys ................. 426/603 |
| 5,344,663 A | | 9/1994 | Jewell et al. ............... 426/549 |
| 5,395,640 A | | 3/1995 | Harris et al. ............... 426/573 |
| 5,409,726 A | * | 4/1995 | Stanley et al. ............. 426/573 |
| 5,468,510 A | * | 11/1995 | Christensen et al. ........ 426/574 |
| 5,518,752 A | | 5/1996 | Ito et al. .................... 426/586 |
| 5,547,513 A | * | 8/1996 | Mallee et al. ................ 127/38 |
| 5,580,390 A | | 12/1996 | Whistler .................... 127/67 |
| 5,609,904 A | | 3/1997 | Koh et al. .................. 426/565 |
| 5,755,890 A | * | 5/1998 | Yuan ........................... 127/71 |
| 5,759,581 A | | 6/1998 | Baensch et al. ............ 424/489 |
| 5,866,192 A | * | 2/1999 | Uesugi et al. .............. 426/634 |
| 5,918,747 A | * | 7/1999 | Noda ......................... 209/155 |
| 5,955,134 A | * | 9/1999 | Nishimura et al. ......... 426/489 |
| 5,962,047 A | * | 10/1999 | Gross et al. .................. 426/48 |
| 6,066,353 A | * | 5/2000 | Marines-Serna Villagran et al. .................................................... 426/637 |
| 6,284,303 B1 | * | 9/2001 | Rowe et al. ................ 426/628 |

FOREIGN PATENT DOCUMENTS

| | | | |
|---|---|---|---|
| DE | 3132556 A1 | * | 7/1983 |
| EP | 0 484 508 B1 | | 5/1992 |
| EP | 0 501 758 B2 | | 9/1992 |
| SU | 1641251 A | * | 4/1991 |
| WO | WO 97/25875 | | 7/1997 |
| WO | WO 98/48639 | | 11/1998 |

OTHER PUBLICATIONS

*The HLB System,* ICI Americas Inc., a subsidiary of Imperial Chemical Industries PLC, (1997).

* cited by examiner

*Primary Examiner*—Milton I. Cano
*Assistant Examiner*—Robert Madsen
(74) *Attorney, Agent, or Firm*—Dorsey & Whitney LLP; David J. Brezner

(57) ABSTRACT

A starchy food-based fat mimetic suitable for use in smooth-textured products, and methods of making the fat mimetic are disclosed. In one method, potato granules are comminuted to fine particles so that at least 90% by weight of the fine potato particles have a particle size of less than about 50 microns. The potato granules can be comminuted by dispersing the potato granules in an aqueous liquid to form a slurry and homogenizing the slurry. The homogenized slurry can be used as a fat mimetic, or it can be dried to form a potato powder which can be added to food products as a fat mimetic. Also, mimetics made by the same process from other starch foods such as fresh potatoes, potato flakes, corn, wheat, rice or beans.

17 Claims, No Drawings

STARCHY FOOD-BASED FINE PARTICLE FAT SUBSTITUTE

The present application claims priority to U.S. Provisional Application Ser. No. 60/104,469, filed Oct. 16, 1998.

FIELD OF THE INVENTION

The invention relates to starchy food-based fine particles useful as a fat substitute in a variety of food products.

BACKGROUND OF THE INVENTION

For many years, doctors have recommended low fat diets. Accordingly, the food industry has directed substantial effort at finding fat mimetics which demonstrate the taste and mouth feel characteristics of fats without their detrimental properties. For example, a microcrystalline starch composition is disclosed as a fat substitute in U.S. Pat. No. 5,580,390. The product is prepared by disintegration of microporous starch granules produced by partial hydrolysis of granular starch. The starch composition is chemically modified as by absorption of a surface modifying agent or by reaction of the starch with a starch reactive etherifying or esterifying agent followed by disintegration of the starch granules to form subgranular fragments of crystalline starch having an average particle size of about 0.1 to about 10 microns. This process requires a number of steps including the formation of the microporous starch granules from granular starch together with the subsequent chemical modification of such granules prior to disintegration. Thus, this product is expensive to produce.

U.S. Pat. No. 5,344,663 describes a cookie dough that contains potato flour as a fat substitute used in amounts between 8 to 62 percent. The patent teaches that while potato flour is suitable for use in cookie dough, the grainy texture of the potato flour particulates is an undesirable property in smooth-textured food products such as cheese, yogurt, and ice cream.

Potato granules and flakes are commercially available sources of dehydrated potato product having known characteristics. However, they have not been used as a fat mimetic. There is a need for an inexpensive fat mimetic which does not have the detrimental effects of fat on the consumer.

SUMMARY OF THE INVENTION

In accordance with the present invention a method is provided for preparing a starchy food-based fat substitute (or mimetic). As used herein, the terms "fat substitute" and "fat mimetic" refer to a food product suitable for use in place of fat. Preferably, the starchy food is potato (granules, flakes or fresh precooked), corn, rice, wheat or beans. The summary will refer to the conditions for treating potato granules as an example but such conditions also apply to the treatment of other starchy food starting materials. The granules are comminuted, preferably by dispersion in an aqueous liquid and homogenization. Preferably, the dispersed potato granules are held at an elevated temperature for sufficient time for swelling prior to homogenizing. The potato granules are homogenized at high pressure to comminute the potato granules to fine potato particles so that at least about 90% by weight of the fine potato particles have a diameter of less than about 50 microns. Homogenization preferably is performed at a pressure in excess of about 3,000 psig. The homogenized slurry can be used as is, or dried as a fine powder.

In another aspect, at least 90% by weight of the fine potato particles have a maximum particle size less than about 25 microns and more preferably less than 10 microns. In one embodiment, the fat substitute comprises an aqueous solution in which the particles are dispersed to form a slurry.

In a further aspect, the invention concerns a starchy food-based, fine particle fat substitute that, when prepared as a slurry, has viscosity properties that closely match that of liquid oils. Preferably, the viscosity of a 5% solution of the fat substitute decreases at least about 10% when the temperature is increased from 30° C. to 70° C. Preferably, a 5% solution of the fat substitute has a viscosity of about 20 cp or greater when prepared at 30° C. In one embodiment, when the fat substitute is formed by drying the comminuted fine particles to a powder, the dried fine particles include many aggregates. Preferably, at least about 50% by weight of the particles have a size between about 5 to 60 microns. (Each aggregate is counted as a single particle in this size range.)

DETAILED DESCRIPTION OF PREFERRED EMBODIMENTS

In accordance with the present invention, the fat substitute is made by comminuting the starchy food starting material to fine particles. As used herein, the term "starchy food" refers to a food with a major starch component but one that is not substantially all starch (e.g. the invention does not encompass the microcrystalline starch of U.S. Pat. No. 5,580,390). Prior to homogenization it can be used as the starting material for the slurry in the fresh precooked form prior to drying or may be dried prior to comminution to a fine powder. Suitable starchy foods include potatoes, corn, rice, wheat, and beans. Preferred predried potato products are potato granules and potato flakes.

As used herein, the term "potato granules" is broadly defined to encompass any products termed by that name in the potato industry. Potato granules are made from any potato tuber, including the Russet variety. A general description of potato granules and their method herein of formation is found in *Potato Processing*, 4th Ed., Talburt W. F. and Smith, O., ("Potato Processing") published by Van Nostrand Reinhold Co., New York, N.Y., pp 535–555. Typically, potato granules are dehydrated single cells or aggregates of the potato tuber dried to about 6 to 7% moisture. Any of the granules made by the processes described in Talburt and Smith are encompassed by the term "potato granules."

Typically, potato granules are formed by washing, peeling and slicing potatoes to a uniform thickness, and cooking. At this point, under a process known as the addback process, intermediate sized potato granules from the finishing end of the process are added back to the cooked product. The cooked potatoes and granule addback are mixed and mashed. They are then typically air-cooled, allowed to condition (equilibrate in temperature and moisture) and again mixed, and air-dried. The product is screened to a fine powder (the source of addback) with a final air-drying process. Most, and essentially all, of the original potato matrix normally is recovered excluding the skin.

In a typical potato granule process, at least about 90% of the granules have a particle size (in diameter) between about 50 and 150 microns. As used herein, all percentages refer to percentage by weight, unless specified otherwise. Potato granules typically include carbohydrates, protein, minerals, fat and fiber, in approximately the following proportions 80%, 8%, 3.6%, 0.6%, 1.4%. Granules are characterized by their ability to form mashed potatoes rapidly by mixing with hot or boiling water. They have well-known functional properties of water displacement, bonding activity in thermally processed foods, mashed potato characteristics, extruding/sheeting functionalities for snack foods and of applications in the baked food industry. Methods for making potato granules and their characteristics as set forth in the above chapter in Talburt and Smith are incorporated herein by reference.

As used herein, the term "potato flakes" is broadly defined to encompass any products termed by that name in the potato industry. Potato flakes are made from any potato tuber, including the Russet variety. A general description of potato flakes and their method of formation is found in Potato Processing. Unlike potato granules, a number of the cells are ruptured during processing. Any of the flakes made by the processes described in Potato Processing are encompassed by the term potato flakes.

Typically, potato flakes are formed by the following process. Fresh potatoes are washed, peeled, and sliced to a uniform thickness, and precooked to gelatinize starch within the potato cells. These blanched pieces are then cooled to retrograde gelatinized starch prior to dehydration. The cooled potato pieces are then subjected to a cook step to break intercellular bonds. After cooking, the potatoes are mashed while still hot. The resultant mash is applied to either single or double-drum dryer rolls and dried to form thin sheets of potato solids dried to about 6 to 7% moisture. The sheets are ground in a conventional hammermill to reduce the particles to a suitable size for packaging and use. Methods for making potato flakes and their characteristics as set forth in the above chapter of Potato Processing, incorporated herein by reference.

The process is also applicable to mashed cooked fresh potatoes. Preferably the mashed potatoes are diluted with water to form a slurry which can be pumped to the homogenizer. A suitable degree of cooking for the most effective product can be selected based on the following general description of process parameters. Potatoes may be peeled by any commercially feasible process. They are then typically sliced to from slices of about ½" to 1" thickness to promote uniformity of cooking. These slices may be cooked in atmospheric steam or by immersion in hot water. Cooking time depends on the raw material and, for steam cooking, on the altitude. Cooking helps break down the intercellular bonds making it easier to create a more uniform mash prior to homogenization. It is preferable to minimize the presence of free soluble starch in the cooked potatoes. Although potatoes can be cooked in a single-pass operation for this process a precook/cool/cook process is preferred. Preferably, potatoes are precooked at a sufficient temperature for a sufficient time long enough to gelatinize substantially all of the starch within the cells. During the cool step the cooked slices are immersed and held in cold water. Free starch is rinsed away by the water and starches in the cells undergo retrogradation. The final cook step weakens intercellular bonds separating the cells with a minimum of cell rupture. Overcooking damages cells and reduces viscosity of the homogenate. Undercooking leaves firm pieces that are not completely ruptured during homogenization. This precook/cook/cool process is described in Potato Processing, pp. 569–575.

Potatoes are preferably mashed immediately following cooking to avoid cell rupture. Mashing can be accomplished by any of the processes common to potato granule and flake processing. The mash can be diluted with hot water to form a slurry that can be pumped to the homogenizer. The slurry preferably is maintained at an elevated temperature prior to homogenization.

It is has been found unexpectedly that comminuting the starting starchy food to a fine particle size results in an excellent fat mimetic (or substitute). The specification will refer first to comminution of potato granules as an example of the starch food. However, the description also applies to the other starchy food starting materials. One method for comminuting potato granules is by mechanical size reduction, preferably by homogenization. In one homogenization technique, the granules first are mixed with an excess of aqueous liquid, preferably water to form a slurry which is held for a sufficient time to allow the granules to absorb the water and to swell. It is preferable that, after the holding period, there is no excess water so that the slurry resembles a very thin mashed potato product. Preferably the swelling of the potato granules during the holding step results in the formation of a substantially continuous flowable mass prior to homogenization. If desired, some excess water could remain or the mashed potato product could be more viscous. To achieve the preferred viscosity of the dispersion of swollen granules at this stage, it is preferable that the weight ratio of aqueous liquid to potato granules be from about 3:1 to 10:1 and more preferably from about 5:1 to about 9:1. However, higher ratios such as 12:1, 15:1 or 25:1 may be used. During the holding period, the temperature is preferably elevated in excess of about 110° F., preferably in the range of about 110° F. to about 200° F. or higher under some circumstances, and more preferably in the range of about 165° F. to about 190° F.

The holding time of the dispersion at such elevated temperatures is inversely related to the temperature. Thus, for example, as little time as about 10 minutes could be employed at higher temperatures while a time of up to 30 minutes to an hour or more may be used for complete hydration at lower temperatures. Typically, 30 to 60 minute holding time at 160° to 190° F. assures efficient size reduction in the next step. It has been found that holding times longer than 60 minutes do not adversely affect size reduction. Substantial to complete hydration or swelling prior to homogenizing has the benefit of more rapid and complete disintegration of granules upon homogenization.

The slurry formed in the holding step is then preferably homogenized under an elevated pressure and temperature. The size of the particles of the homogenized slurry depends on the homogenizing operating conditions. As the pressure is increased, the percentage of particles in the desired range is increased. Pressures as low as about 1,000–3,000 psig can create particles less than 50 microns depending on the condition of the swollen granules in the slurry and the type of homogenizer. Preferably, the pressure is excess of about 3,000 psig to achieve a homogenized slurry having the desired particle size. More preferably, the pressure is in excess of about 5,000 psig. When reference is made to "particle size", the diameter of the potato particle at its widest point is intended. Preferably, at least about 90% of the potato particles have a particle size of less than about 50 microns. More preferably, at least about 90% of the potato particles of the homogenized slurry have a particle size less than 25 microns. Still more preferably, at least about 90% of the potato particles of the homogenized slurry have a particle size less than about 25 microns, yet more preferably less than 10 microns, to as low as a range of 0.10 to 10.0 microns, to as low as 1 micron.

One suitable type of homogenizer includes a positive displacement reciprocating pump with a multiplex single-action plunger and a three-piece homogenizing valve assembly. An example of a homogenizer of this type is the Niro Soavi (Model #NS 2006L) sold by Niro, Inc. of Hudson, Wisconsin. To make the desired product, this type of homogenizer is typically operated at pressures in excess of about 4,000 to 5,000 psig and preferably in the range of about 7,000 to 10,000 psig or more. The pressure is applied by forcing the liquid slurry through small passages under pressure at velocities of 600–1000 ft/sec. The elevated pressure serves to comminute the particles by a combination of factors including shearing (tear against a fixed surface), impingement (high velocity impact against a fixed surface), distention (compression and tension against a fixed surface), and cavitation (bursting due to high/low pressure variation). This type of homogenizer tends to operate at elevated temperatures (about 140° F. to 200° F., or higher, and preferably about 160° F. to 190° F.) due to the frictional forces created during homogenization.

Another suitable type of homogenizer uses sonic forces that enable the use of lower pressure. One such sonic homogenizer is sold under the trade name "XS" Sonolator by Sonic Corporation, Stratford, Conn. It is an in-line homogenizer design that converts the kinetic energy of high-velocity liquid streams into high-intensity mixing energy. The conversion of energy within the liquid stream is accomplished by using a physical phenomenon used known as a "jet-edge tone." Typically, a jet-edge of process liquid under pressure (usually supplied by a positive displacement pump) is forced to an elliptical orifice at a velocity of 300 fps or more, and is directed at the edge of a blade-like obstacle in its path. Between the orifice and blade-like obstacle, the velocity of liquid sheds vortices perpendicular to the original flow vector. The shedding pattern is stable and alternates so that a steady oscillation common in the sonic range occurs in the liquid. The stresses set up with the liquid by sonic oscillations cause the liquid to cavitate in the ultrasonic frequency zone. The high level of cavitation, combined with shear and turbulence in the mixing chamber, shatters the particles.

For convenient storage, distribution and handling, the homogenized slurry can be dried to form a powder. As used herein the term "potato powder" refers to dried fine potato particles suitable for use as a fat mimetic Preferably, the potato powder has a moisture content of less than about 12%, more preferably, less than about 10%, and most preferably, about 8% or less. Upon rehydration, the potato particles retain the properties that render them ideal for use as a fat mimetic. Any suitable drying technique can be used to form the potato powder. Because of its convenience and ease of use, particularly with large batches, a preferred drying method is conventional spray drying. The term "fine starchy food powder" refers to a fine starchy food powder having the moisture content in the range of said potato powder.

The term "powder particles" refers to the individual fine particles and aggregates of such fine particles. Each aggregate is considered to have the particle size of the total aggregate in contrast to the term "fine particles" which refers to the individual fine particles whether aggregated or not.

Upon spray drying, the potato particles are appreciably larger than the particles of the homogenized slurry, presumably due to the formation of aggregates of fine potato particles. The majority of the powder particles in the potato powder formed by spray drying range in size from about 5 microns to about 60 microns, and more typically from about 15 microns to about 60 microns, and even more typically, about 15 to about 45 microns, with the average particle size being about 30 microns. The size of the particles of the potato powder may vary depending upon the drying methods used.

When the potato powder is rehydrated, and observed under a microscope, smaller particles, ranging in size from about 0.1 to about 10.0 microns (i.e. the size of the majority of particles from the homogenated slurry), can be seen breaking away somewhat from the aggregate, forming a more loosely connected, less compacted aggregate. When the potato powder is dissolved in excess water and heated to about 60° C., the potato particles typically swell, so that the majority of particles range in size from about 10 microns to about 100 microns, and more typically from about 20 microns to about 70 microns. The rehydrated potato powder is the functional equivalent of the homogenized slurry. For example, despite the increased particle size, it does not impart a grainy texture, and thus serves as an excellent fat mimetic, even in smooth-textured food products.

When the potato powder is dissolved in water to prepare a solution comprising about 2.5% potato particles or less, the solution behaves as a Newtonian fluid. As the solution approaches 5%, the viscosity mimics that of liquid oils in that the viscosity of the solution decreases with increasing temperature. It is believed that this property helps impart a fatty mouthfeel. When a 5% solution of the potato powder is increased from 30° C. to 70° C., the viscosity decreases at least about 10%, more preferably at least about 16%, and most preferably, at least about 22% or more. Preferably, the viscosity of a 5% solution of the potato powder at 30° C. is above about 20 cp, more preferably above about 22 cp, and more preferably, about 25 cp or more. As shear is applied to the potato particle-containing solution, it becomes non-Newtonian, and is more aptly described as shear-thinning and pseudo-plastic. However, when the temperature of the solution increases above about 60° C., or when it is subjected to high shear, fluid behavior returns to resemble that of Newtonian fluids.

The potato powder of the present invention is highly hydrophilic, and while it disperses well in oil, it is not oil soluble. The hydrophile-lipophile balance (HLB) value, which is widely used for classifying surfactants, is an indication of a substance's solubility in the aqueous and oil phases. The potato powder of the present invention preferably has an HLB value of about 12 or greater, preferably about 14 or greater, more preferably about 16 or greater, and most preferably about 18 or greater.

The comminuted potato particles of the homogenized slurry and dried potato powder made by the above methods are excellent fat substitutes. They may be mixed into a variety of edible food products such as batter breading, beverages, bakery products, sauces, cultured dairy products, yogurt, chocolate confections, puddings, ice cream, butter, margarine, salad dressing and mayonnaise, among others. In one embodiment, the comminuted potato particles of the present invention can be added to these products in the aqueous dispersion in which they exit a homogenizer. Alternatively, the products can be concentrated depending on the desired end use.

In one embodiment of the corn, rice, wheat and bean embodiments, conventional flours of these starchy foods may be used as a starting material. The flours, typically not precooked, may be mixed with water to form slurries at the same concentrations as for the potato granules. The slurries may be held at the same concentration and at the same suitable temperatures and times as the potato granules for swelling with the concomitant benefits on disintegration during homogenization. This holding at elevated temperature is one form of "precooking" for purposes of the present invention. The same size ranges for the comminuted corn, rice and wheat flours may be used. In another alternative, dry corn, rice, wheat and beans which typically have not been precooked, and are ground, are formed into a slurry and held at an elevated temperature as described for the granules. Preferably, the size of the particles formed during grinding is selected to form a flowable slurry to be fed to the homogenizer.

Alternatively fresh corn, rice, wheat or beans can be cooked and sized to form a flowable slurry for homogenization in a similar way to the method of fresh potatoes described above.

In general, the principles described for the potato products apply to the other predried starchy foods products such as potato flakes, corn, rice, wheat and beans. Somewhat different conditions may be used for the different starting materials (e.g., a shorter holding time for flakes than granules to swell the particles in a slurry prior to homogenization). The differences in the properties of these dry starchy foods are well known in the art and do not alter the effectiveness of these starchy food materials in fine particle form as fat substitutes.

Some end products in which the fat substitutes of the present invention can be used as a fat substitute are as follows.

1. Beverages, such as cream liqueurs, cordials, mixers; beverage syrups and mixes, i.e., cocoa mixes; flavored waters and stills; fruit juices/punches; and carbonated seltzers, sodas or waters.
2. Confectionery, such as jelly-type candies (gum drops and licorice), hard candies and gums, sweet spreads, sugarless candies, nougats/fondants, fruit chews/caramels/taffy/fudge, marshmallows, meringues and foam-style confectionery.
3. Cheese products, such as processed cheese, cheese spreads, cheese foods, cheese sauces, cheese dips, cream cheese, cottage cheese dressings, hard cheeses, semi-soft cheeses, imitation cheeses and related products.
4. Frozen confections, ices, and ice cream products, such as fruit sherbets and sorbets, frozen yogurts, frozen ice pops (fruit juice, cream or other flavors), ice milk, low-fat ice creams, conventional ice creams and gourmet ice creams and ice cream toppings and sauces.
5. Fruit preparations, such as ice cream toppings, fruit bakery fillings for baked products and pastries, fruit preparations for yogurt and other dairy products; and, finally, jams, jellies, marmalades and preserves.
6. Fluid milks, spreads, and creams, such as concentrated milk, flavored milks (chocolate, strawberry, egg nog, etc.), imitation milks and syrups, milk shakes, margarine, margarine-butter blends, reduced fat spreads, cream and imitation cream products, including coffee whitener and whipped topping.
7. Mixes for water gels and dairy products, such as gelatin dessert mixes (cold or hot preparation, refrigerated, frozen or shelf-stable), dry mix and liquid instant breakfast mix, bakery filling creams/custards, whipped toppings and sauces, ice cream mixes/ready to freeze mixers, mousses, puddings, cheese cakes and flans/custards.
8. Pastries and baked products, such as syrups for glazing, pies, pie fillings, cheese cakes, cookie mixes and finished shelf-stable cookies, icings and frostings, including no-fat, low-fat, etc.; bakery fillings (dairy and fruit based), topping, glazes; and baked food products, including cakes, biscuits, muffins, breads and donuts.
9. Processed dairy products, such as yogurt beverages, yogurts, liegeois-type pudding, milk gels, dessert creams, buttermilk, buttermilk beverages, fresh cheese products, dips (both imitation and dairy based), sour cream (imitation, cultured and direct set), cultured and direct set half-and-half or butter products.
10. Snack food products, such as extruded or sheeted snack foods, intermediate snack food pellets/shapes, crackers, chips (potato, corn, rice and wheat based), cereals (ready-to-eat, etc.), granola snacks and other novelties.
11. Soups, sauces, salad dressings, and dips, such as bottled, canned, dry or frozen soups/mixes; specialty dry mixes, salad dressing mixes, savory and seasoned mixes, dips, sauces, salsas, and gravies (ethnic styles inclusive); reduced calorie/no-fat/low-fat sauces/gravies/salsas; mayonnaise and salad dressings/spreads, including oil and vinegar; dairy based, tomato based and other vegetable or fruit puree dressings and spreads.
12. Structured foods and meat products, such as prepared foods and entrees, i.e., lasagna, raviolis, au gratin, flavored hashbrowns, etc.; macaroni and cheese, pasta products and sauces. Meat products that may be derived from poultry, beef, pork, lamb, etc., including frankfurters, sausages, low-fat meat patties, marinades and seasoning pumped into hams or poultry.
13. Battered/breaded food products including meats, vegetables and fruits.

The comminuted potato particles can be incorporated in food products as an aqueous dispersion or as a dry powder. The proportion of potato particles to other ingredients varies over a wide range, depending on the end use. Referring to dry weight of the comminuted potato particles, fat mimetic properties can be realized using amounts as low as 0.1% of the total dry weight of ingredients. However, for some food products, about 30% or even more of the comminuted potato particles may be desired. The comminuted potato particles can be added as a fat substitute to fluid milks and flavored milks at levels from about 0.1%–3.0% to increase viscosity, enhance opacity and impart a mouthfeel similar to fill fat products. Similarly, about 0.1% to 5% of the comminuted potato particles can be added to yogurt and sour cream preparations for the same reasons. Up to about 10% of the comminuted potato particles can be added to margarine or butter to produce fat reduced spreads or sticks. Reduced fat pasteurized process cheese and cheese food/spreads can be prepared with inclusion of up to about 10% or more of the comminuted potato particles. When added at levels of up to about 5% the comminuted potato particles function as a fat substitute, stabilizer and opacity enhancer for no and low-fat ice creams. Reduced fat salad dressing are produced with addition of up to about 10% of the comminuted potato particles.

EXAMPLES

The following examples are offered for illustrative purposes only, and are not intended to limit the scope of the present invention in any way.

Example 1

Preparation of Homogenized Potato Granule Slurry

Potato granules were blended with 1 part potato granule to 7 parts of water (by weight), heated and held at a temperature of 160° F. to 190° F. for 1 hour. The granules absorbed water and completely swelled to form a slurry. Two different types of homogenizers were used to comminute the potato particles in the slurry. The first homogenizer had a positive displacement reciprocating pump with a multiplex single-action plunger and a three-piece homogenizing valve assembly (manufactured by Niro, Hudson, Wis.). Pressures of 9,000 to 10,000 psig were used at a temperature of about 160° F. to 190° F. Visual inspection of the resulting homogenized slurry under a microscope revealed that the vast majority of potato particles have a size of less than about 10 microns.

The second homogenizer used was an XS model Sonolator sonic-type homogenizer, which was used at about 5,000 psig. The resulting homogenized slurry has similar characteristics to the slurry homogenized using the Niro homogenizer.

Example 2

Preparation of Potato Powder

The homogenized slurry prepared in Example 1 was spray dried under the following conditions. The homogenate was pumped to an FEW pilot spray drier and @ 2200 psig. The air inlet temperature was adjusted to provide drier exhaust temperatures of 175° F. to 200° F. When reconstituted, the resultant potato powder can be used as a texturizer in applications as described above.

Using a Coulter LS Particle Size Analyzer, it was determined that the dry potato powder was comprised of potato particles having the following sizes:

| | |
|---|---|
| Mean particle size: | 31.80 µm |
| Median particle size: | 29.22 µm |
| Standard deviation: | 19.72 µm |

About 90% by weight of the particles had a size of greater than 8.82 µm; 75% were greater than 17.55 µm, 50% were greater than 29.22 µm, 25% were greater than 42.76 µm, and 10% were greater than 57.08.

When the spray dried product was dissolved in water at a dilution of 1:6 (w:w), and heated to 60° C., the particles swelled appreciably. Particle size distribution for this solution was as follows:

| | |
|---|---|
| Mean particle size: | 51.04 µm |
| Median particle size: | 42.04 µm |
| Standard deviation: | 38.70 µm |

About 90% of the particles had a size of greater than 10.22 µm; 75% were greater than 22.48 µm, 50% were greater than 42.04 µm, 25% were greater than 69.59 µm, and 10% were greater than 104.9 µm.

The dry potato powder had an HLB value of about 19.

When a 5% solution of the potato powder was prepared in water at 30° C., the viscosity was 25 cp. When temperature was increased to 70° C., the viscosity dropped to 19 cp.

Example 3

Preparation of Reduced-Fat Food Products

The following recipes compare the preparation of reduced-fat food products using the dry potato powder form of the comminuted potato particles of the present invention with conventional preparation methods. The first recipe demonstrates the cost savings that can be achieved by using comminuted potato particles as a fat mimetic compared to conventional products.

A. LOW FAT SOUR CREAM (Two-Thirds Reduced Fat—6%)

| Ingredients | Potato-Containing Formula (% Weight) | Conventional Formula (% Weight) |
|---|---|---|
| Potato Powder | 3% | — |
| Nonfat Dry Milk | 3% | 10% |
| Skim Milk | 77.442% | 73.242% |
| 34% Fat Heavy cream | 16% | 16% |
| Sodium Citrate | 0.1% | 0.1% |
| Potassium Sorbate | 0.05% | 0.05% |
| 15X Starter Distillate | 0.1% | 0.1% |
| Lactic Acid | 0.1% | 0.1% |
| Citric Acid Solution (50%) | 0.1% | 0.1% |
| Gelatin/Pectin Stabilizer | 0.1% | 0.3% |
| Sour Cream Culture | 0.008% | 0.008% |
| TOTAL | 100% ($.1833/lb) | 100% ($.2052/lB) |

The process for making the potato powder-containing low-fat sour cream is as follows. Disperse potato powder, nonfat dry milk, sodium citrate, and potassium sorbate into skim milk. Blend with heavy cream. Heat to 140° F. or higher. Homogenize in dual stage homogenizer (500/2500 psi). Pasteurize at 176–178° F. for 25–32 seconds. Cool to 72–800° F.

Inoculate vat with sour cream cultures. Incubate at 72–75° F. for 14–16 hours. Target pH of 4.65–4.85 and Titratable Acidity (T.A.) of 0.88–0.93. Add acids and starter distillate while breaking the set in the vat. Pump the low fat sour cream through an in-line homogenizing screen. Package and refrigerate.

The procedure for the preparing the conventional product is the same as that as the potato-containing formula with the exception that the incubation occurs at temperatures ranging from about 72–75° F. for about 15–18 hours.

B. YOGURT (Plain)

| Ingredients | Potato-Containing Product (% Weight) | Conventional Products (% Weight) | |
|---|---|---|---|
| Potato Powder | 3.0% | | |
| Skim Milk | 96.95% | 94.75% | 94.84% |
| NFDM | | 5.0% | 5.0% |
| Gelatin (250 Bloom) | | 0.2% | |
| Pectin | | | 0.2% |
| Yogurt Cultures | 0.05% | 0.05% | 0.05% |
| TOTAL | 100.0% | 100.0% | 100.0% |

The process for making the potato-containing yogurt is as follows. Mix dry potato powder with skim milk and heat to 1000° F. Homogenize in dual stage homogenizer (500/2500 psi).

Pasteurize at 176–185° F. for 25–32 seconds. Cool to 110° F. and inoculate with yogurt cultures. Incubate at 107–113° F. for about 3.5 to 4.2 hours. Target a pH of 4.2–4.5 and T.A. of 0.92–0.95. Cool and package as desired. Applicable for use as pre-stirred or fruit on the bottom.

The process for preparing conventional yogurt is the same, except that rather than using potato powder, nonfat dry milk blended with pectin or gelatin is mixed with the skim milk. Another difference is that the conventional recipe requires a longer incubation time of about 5 hours. Thus, use of the comminuted potato particles shortens the ripening time by nearly 20%.

NON-FAT ICE CREAM (Total Solids 32.8%)

|  | Conventional Product | | Potato-Containing Product | |
|---|---|---|---|---|
| Ingredients | Chocolate | Vanilla | Chocolate | Vanilla |
| Potato Powder | — | — | 4% | 4% |
| Natural Vanilla (2X) | — | 0.3% | — | 0.3% |
| Chocolate Flavor | .5% | — | .5% | — |
| Stabilizer Blend (Kelco Dariloid 100) | .2% | .2% | .2% | .2% |
| Milk (Skim) | 71.1% | 71.57% | 74.1% | 74.57% |
| Granulated Sugar | 13.0% | 13.0% | 13.0% | 13.0% |
| Corn Syrup Solids (35–48 DE) | 6.0% | 8.0% | 6.0% | 8.0% |
| Non-Fat Dry Milk | 7.0% | 7.0% | — | — |
| Cocoa (12% Fat) | 2.0% | — | 2.0% | — |
| Emulsifier Blend | .2% | .2% | .2% | .2% |
| TOTAL | 100% | 100% | 100% | 100% |

Blend all the dry ingredients. Blend all the liquid ingredients except for the flavors. Add the dry ingredients and emulsify with maximum agitation. Mix and heat to 140° F. Homogenize in a dual stage homogenizer (500/2500 psi) or a single stage at 3000 psi. Add flavor as indicated. Freeze with desired overrun (target 75% or higher).

D. 68% REDUCED FAT MARGARINE SPREAD (25% Fat)

| Ingredients | % Weight |
|---|---|
| Fat Phase | |
| Dimodan LSK (Danisco) | 0.4% |
| Beta Carotene | 4 ppm |
| Flavor #5104 (Danisco) or #2340 | 0.15% |
| Fat Blend | 24.19% |
| 35 Parts Cottonseed Oil 41°/42° C. (or Soybean Oil 41°/42° C.) | (8.47%) |
| 30 Parts Liquid Vegetable Oil | (7.25%) |
| 35 Parts Cottonseed Oil 35°/36° C. (or Soybean Oil 35°/36° C.) | (8.47%) |
| Water Phase | |
| Water | 68.01% |
| Grinsted LFS 560 Pectin | 2.0% |
| Salt | 1.2% |
| Flavor #5105 (Danisco) | 0.05% |
| Potato Powder | 4.0% |
| TOTAL | 100% |

Blend dry ingredients for water phase and disperse into water. Pasteurize as necessary (194° F. for 10 minutes). Blend fat phase ingredients and heat to 140° F. to 158° F. Cool to 122° F. to 140° F. Cool the water phase to 122° F.–140° F. and mix the water phase into the oil phase using firm agitation (to the point of minimal splattering on the sidewalls of the mixing vessel). The water phase added to the oil phase should not exceed a 25% volume addition rate-per-minute allowing 4–5 minutes for complete transfer of the water phase into the oil phase. Invert the emulsion by cooling down with constant gentle stirring. (Target a pack-off exit temperature of 44°–54° F. for automated continuous equipment.) If using manual equipment, target a product packaging temperature of 50°–55° F. Refrigerate at 38° F.

E. 25% REDUCED FAT MARGARINE SPREAD (60% Fat)

| Ingredients | Conventional Product 80/20 M (% Weight) | Potato-Containing Product 60/40 Margarine (% Weight) |
|---|---|---|
| Fat Phase | | |
| Dimodan PVK (Danisco) | 0.15% | 0.15% |
| Soya Lechithin | 0.20% | 0.20% |
| Beta Carotene | 4 ppm | 4 ppm |
| Flavor #3647 (Danisco) | 0.07% | 0.07% |
| Fat Blend | 79.58% | 59.6% |
| 20 Parts Cottonseed Oil 41°/42° C. | (15.92%) | (14.9%) |
| 10 Parts Soya Bean Oil 35°/36° C. | (7.96%) | — |
| 70 Parts Liquid Vegetable Oil | (55.5%) | (44.7%) |
| Water Phase | | |
| Water | 18.5% | 36.067% |
| Whey Powder | 0.5% | — |
| Salt | 1.0% | 1.0% |
| Potato Powder | — | 2.9% |
| Flavor #2478 (Danisco) | — | 0.013% |
| TOTAL | 100% | 100% |

The procedure for making both the potato-containing product and the conventional product are as follows. Blend dry ingredients for water phase and disperse into water. Pasteurize as necessary (194° F. for 10 minutes). Blend fat phase ingredients and heat to 140° F. to 158° F. Cool the water phase to 122° F. to 140° F. and mix the water phase into the oil phase using firm agitation (to the point of minimal splattering on the sidewalls of the mixing vessel). The water phase added to the oil phase should not exceed a 25% volume addition rate-per-minute allowing 4–5 minutes for complete transfer of the water phase into the oil phase. Invert the emulsion by cooling down with constant gentle stirring. (Target a pack-off exit temperature of 44°–54° F. for automated continuous equipment.) If using manual equipment, target a product packaging temperature of 50°–55° F. Refrigerate at 38° F.

F. VERY LOW/NO FAT CHOCOLATE MILK

| Ingredient | Potato-Containing Product (% Weight) | Conventional Product (% Weight) |
|---|---|---|
| Potato Powder | 1.0% | — |
| Carrageenan | — | 0.02% |
| Skim Milk | 91.5% | 92.48% |
| Sugar | 6.0% | 6.0% |
| Cocoa Powder | 1.5% | 1.5% |
| TOTAL | 100% | 100% |

Dry blend the potato powder with the sugar and cocoa powder. For the conventional product, dry blend the carrageenan with the sugar and cocoa powder. Disperse the dry blend into the milk with high agitation to avoid lump formation. Heat to 140° F. and homogenize at 700/1500 psi (two-stage) or 2000 psi (single-stage). Pasteurize at 176–185° F. for 25–32 seconds. Cool to 38° F. and package.

G. RANCH STYLE BUTTERMILK SALAD DRESSING (50% Reduced Fat)

| Ingredients | Conventional Product (35% Fat) % (By Weight) | Potato-Containing Product (17% Fat) % (By Weight) |
|---|---|---|
| Potato Powder | — | 6.0% |
| Vegetable Oil | 34.19% | 17.0% |
| Buttermilk (Cultured) | 23.0% | 23.0% |
| Buttermilk Powder | 2.4% | — |
| Water | 30.55% | 46.14% |
| Egg Yolk (Pre-pasteurized) | 2.0% | 2.0% |
| Sugar | 1.8% | 1.8% |
| Salt | 1.6% | 1.6% |
| Modified Corn Starch | 3.0% | — |
| Lactic Acid (88%) | 0.41% | 0.41% |
| Garlic Powder | 0.1% | 0.1% |
| Celery Salt | 0.09% | 0.09% |
| Sorbic Acid | 0.05% | 0.05% |
| Dehydrated Parsley Flakes | 0.04% | 0.04% |
| Black Pepper | 0.02% | 0.02% |
| Pectin or Carrageenin | 0.75% | 0.75% |
| TOTAL | 100% | 100% |

Preblend the pectin, sugar, salt and starch or potato powder and add into the water phase (water and lactic acid). Heat to 145° F. to dissolve pectin. Cool to 122° F. and add cold buttermilk, egg yolk, seasoning, sorbic acid and buttermilk powder. Add the oil slowly to the water phase with constant agitation (i.e., to the point of minimal splattering on the sidewalls of the vessel). The oil phase added to the water phase should not exceed 25% volume addition rate-per-minute allowing 4–5 minutes for complete transfer of the oil phase into the water phase. Blend with adequate aeration as high speed. Homogenize at less than 75 psi or use a colloid mill. Package and refrigerate at 38° F.

H. CREAMY ITALIAN SALAD DRESSING (50% Reduced Oil)

| Ingredients | Conventional (60% Fat) (% Weight) | Potato-containing (30% Fat) (% Weight) |
|---|---|---|
| Potato Powder | — | 6.0% |
| Pectin | 0.5% | 0.5% |
| Vegetable Oil | 58.0% | 28.0% |
| Water | 18.48% | 43.48% |
| Vinegar (5% Acetic Acid) | 13.0% | 13.0% |
| Parmesan Cheese, Grated | 5.0% | 4.0% |
| Salt | 2.0% | 2.0% |
| Sugar | 1.5% | 1.5% |
| Lemon Juice | 1.0% | 1.0% |
| Dehydrated Minced Onion | 0.15% | 0.15% |
| Dehydrated Minced Garlic | 0.12% | 0.12% |
| Dry Mustard | 0.09% | 0.09% |
| Ground Celery Seed | 0.08% | 0.08% |
| Oregano, Leaf | 0.02% | 0.02% |
| Paprika | 0.02% | 0.02% |
| Thyme | 0.02% | 0.02% |
| Black Pepper | 0.01% | 0.01% |
| Bay Leaf, Ground | 0.005% | 0.005% |
| Marjoram, Ground | 0.005% | 0.005% |
| TOTAL | 100% | 100% |

Preblend dry ingredients (pectin and/or potato powder, salt, sugar) and add into the water phase (water, vinegar, lemon juice). Heat to 145° F. to solubilize the pectin. Cool to 95° F. and add Parmesan cheese and spices with adequate mixing. Add the oil slowly to the water phase with constant agitation (i.e., to the point of minimal splattering on the sidewalls of the vessel). The oil phase added to the water phase should not exceed 25% volume addition rate-per-minute allowing 4–5 minutes for complete transfer of the oil phase into the water phase. Blend completely or pass through a colloid mill (minimal shear setting to avoid damage to particulates). Package and refrigerate at 38° F.

I. LOW FAT MAYONNAISE SPREAD—TACO FLAVORED (Cholesterol Free and 50% Reduced Fat)

| Ingredients | Conventional Product (67% Fat) (Weight %) | Potato-Containing Product (33% Fat) (Weight %) |
|---|---|---|
| Potato Powder | — | 5.0% |
| Pectin | 0.75% | 0.75% |
| Soybean Oil | 67.8% | 33.0% |
| Egg Whites (pre-pasteurized) | 13.30% | 13.30% |
| Water | 9.05% | 38.85% |
| Vinegar (5% Acetic Acid) | 6.75% | 6.75% |
| Corn Syrup (35 DE) | 1.00% | 1.00% |
| Salt | 1.00% | 1.00% |
| Lactic Acid (88%) | 0.2% | 0.2% |
| Mustard Flour (Optional)* | 0.1% | 0.1% |
| Cayenne Pepper (Optional)* | 0.05% | 0.05% |
| TOTAL | 100% | 100% |

*Optional ingredients can be omitted to provide a non-flavored, low-fat mayonnaise.

Mix water, vinegar and lactic acid. Blend the pectin and/or the potato flour into the water phase with a constant agitation and heat to 145° F. to solubilize the pectin. Cool to below 125° prior to addition of egg whites. Add preblended dry ingredients (seasonings, etc.) and egg whites to the water phase. Add the oil slowly to the water phase with constant agitation (i.e., to the point of minimal splattering on the sidewalls of the vessel). The oil phase added to the water phase should not exceed 25% volume addition rate-per-minute allowing 4–5 minutes for complete transfer of the oil phase into the water phase. Blend with adequate aeration at high speed. Homogenize at less than 50 psi or use a colloid mill. Package and refrigerate at 30° F.

J. POURABLE SALAD DRESSING (43% Reduced Fat)

| Ingredients | Conventional Product (35% Fat) (Weight %) | Potato-Containing Product (20% Fat) (Weight %) |
|---|---|---|
| Potato Powder | — | 6.0% |
| Water | 22.82% | 38.82% |
| Vegetable Oil (liquid) | 35.0% | 20.0% |
| Sugar | 10.0% | 7.0% |
| Egg Yolk (pre-pasteurized) | 4.0% | 4.0% |
| Vinegar (5% Acetic Acid) | 20.0% | 20.0% |
| Salt | 1.5% | 1.5% |
| Modified Corn Starch | 4.0% | — |
| Carrageenin or Pectin | 0.75% | |
| Non Fat Dry Milk or Buttermilk Solids/Powder | 1.5% | 1.5% |
| Dimodan LSK (Danisco) | 0.2% | 0.2% |
| Onion Powder | 0.02% | 0.02% |
| Garlic Powder | 0.01% | 0.01% |
| Mustard Powder | 0.02% | 0.02% |
| TOTAL | 100% | 100% |

For the conventional product, the procedure is as follows. Blend all dry ingredients. Mix water and vinegar and heat to above 145° F. Mix in dry ingredients with increased agitation to completely blend. Let mixture cool to 130° F. and add egg yolks (pre-pasteurized). Add preblended dry ingredients (seasonings, etc.) and egg whites to the water phase. Add the oil slowly to the water phase with constant agitation (i.e., to the point of minimal splattering on the sidewalls of the vessel). The oil phase added to the water phase should not exceed 25% volume addition rate-per-minute allowing 4–5 minutes for complete transfer of the oil phase into the water phase. Homogenize at less than 75 psi or use a colloid mill. Target pH at 3.0 to 4.0. Package as desired.

For the potato-containing product, the procedure is as follows. Melt the Dimodan LSK into a portion of the liquid oil. Add the mixture to the remaining oil. Blend all dry ingredients. Mix water and vinegar and heat to above 145° F. Mix dry ingredients into the water and vinegar. Let mixture cool to 122–140° F. Mix the oil mixture into the water mixture with agitation (i.e., to the point of minimal splattering on the sidewalls of the vessel). The oil phase added to the water phase should not exceed 25% volume addition rate-per-minute allowing 4–5 minutes for complete transfer of the oil phase into the water phase. Homogenize at less than 75 psi or use a colloid mill. Package and refrigerate at 38° C.

K. REDUCED FAT PASTEURIZED PROCESS CHEESE OR PROCESSED CHEESE FOOD/SPREAD

| Ingredients | Low Fat Cheese Food/Spread (% Weight) | Low Fat Process (% Weight) | Conventional product (% Weight) |
| --- | --- | --- | --- |
| Potato Powder | 8.0 | 8.0 | — |
| Water | 39.5 | 28.0 | 7.5 |
| Cheddar (3 months) | 46.0 | 56.0 | 80.0 |
| Cheddar (9 months) | 4.5 | 6.0 | 9.5 |
| Salt | 0.0 | 0.0 | 1.0 |
| Disodium Phosphate | 1.0 | 1.0 | 1.0 |
| Cheddar Paste (Enzyme Modified) | 1.0 | 1.0 | 1.0 |
| Annatto | 0.15 | 0.15 | 0.10 |
| TOTAL | 100% | 100% | 100% |

Blend all dry ingredients and disperse in water. Cook to 145° F. Grate cheese and combine with dry ingredients and water. Cook and stir constantly until 170° F. is reached (in a double boiler steam jacketed kettle, or steam injection cheese cooker-predetermine steam condensation water contribution). Pour into molds. Cool, wrap, and refrigerate. Allow 72 hours before evaluation.

Example 4

Preparation of Homogenized Potato Flake Slurry

The method of Example 1 is used substituting potato flakes for potato granules. This slurry is prepared into a potato powder as set out in Example 2.

Example 5

Preparation of Homogenized Slurry from Raw Potatoes

Fresh Russet potatoes were abrasive peeled and sliced to about 1" thick. These slabs were heated in 190° F. water for about 20 minutes. The precooked slabs were then cooled in a 70° F. water tank for about 60 minutes. The precooked and cooled slabs were then further cooked for 60 minutes in a 160° F. water bath. Cooked potato slabs were mashed and 190 ° F. water was added to the resultant mash to create a slurry with solids content of about 12%. This slurry is homogenized as set forth in Example 1 and prepared into a potato powder as set out in Example 2.

What is claimed is:

1. A method for making a potato product comprising comminuting precooked potato comprising potato flakes, potato granules or both, to fine potato particles, wherein at least about 90% by weight of said fine potato particles have a particle size less than about 50 microns.

2. The method of claim 1 in which at least about 90% by weight of said fine potato particles have a particle size of less than about 25 microns.

3. The method of claim 1 wherein at least about 90% by weight of said line potato particles have a particle size of less than about 10 microns.

4. The method of claim 1 wherein said precooked potato is comminuted and mixed with an aqueous liquid to form a slurry of potato particles in an aqueous liquid and said slurry is homogenized to form said fine potato particles.

5. The method of claim 4 wherein said precooked potato particles in said slurry are held at al elevated temperature for sufficient time to swell the potato particles.

6. The method of claim 5 in which said elevated temperature is in excess of about 110° F.

7. The method of claim 5 in which said slurry is held for at least 10 minutes prior to homogenization.

8. The method of claim 5 in which said slurry is in the form of a substantially continuous flowable mass prior to homogenization.

9. The method of claim 5 in which most of said aqueous liquid is absorbed by said potato particles prior to homogenization.

10. The method of claim 4 in which the weight ratio of aqueous liquid to potato at the time of mixing is from about 3:1 to about 10:1.

11. The method of claim 4 in which said homogenization is performed at a pressure in excess of about 3,000 psig.

12. The method of claim 4 further comprising drying the homogenized slurry to form a starchy food powder.

13. The method of claim 4 further comprising drying the homogenized slurry to form an edible potato powder.

14. The method of claim 4 in which said homogenizing is performed at a pressure of at least about 1000 psi.

15. The method of claim 1 in which said precooked potato comprises potato granules.

16. The method of claim 1 in which said precooked dried potato comprises potato flakes.

17. The method of claim 1 in which said potato product is suitable for use as a fat substitute.

\* \* \* \* \*